(12) United States Patent
Lee (10) Patent No.: US 8,270,782 B2
(45) Date of Patent: Sep. 18, 2012

(54) OPTICAL FIBER SENSOR

(75) Inventor: Ju Han Lee, Seongnam-si (KR)

(73) Assignee: University of Seoul Industry Cooperation Foundation, Seoul (KR)

( * ) Notice: Subject to any disclaimer, the term of this patent is extended or adjusted under 35 U.S.C. 154(b) by 334 days.

(21) Appl. No.: 12/695,288

(22) Filed: Jan. 28, 2010

(65) Prior Publication Data

US 2011/0182544 A1 Jul. 28, 2011

(51) Int. Cl.
*G02B 6/00* (2006.01)
*G01J 5/08* (2006.01)

(52) U.S. Cl. ..... 385/12; 385/123; 385/122; 250/227.11; 250/227.14; 250/227.18

(58) Field of Classification Search ..... 385/12, 385/13, 122, 123; 250/227.11, 227.14, 227.18
See application file for complete search history.

(56) References Cited

U.S. PATENT DOCUMENTS

| | | | | |
|---|---|---|---|---|
| 5,394,235 | A | 2/1995 | Takeuchi et al. | 356/73.1 |
| 5,822,049 | A * | 10/1998 | Dimmick | 356/72 |
| 6,698,919 | B2 * | 3/2004 | Chi et al. | 374/45 |
| 7,245,790 | B2 * | 7/2007 | Brown et al. | 385/12 |
| 7,480,460 | B2 * | 1/2009 | Colpitts et al. | 398/108 |
| 8,031,989 | B2 * | 10/2011 | Sanders | 385/12 |
| 2006/0285850 | A1 * | 12/2006 | Colpitts et al. | 398/108 |
| 2011/0122417 | A1 * | 5/2011 | Molin et al. | 356/478 |
| 2011/0182544 | A1 * | 7/2011 | Lee | 385/12 |

FOREIGN PATENT DOCUMENTS

JP 10-048067 2/1998

OTHER PUBLICATIONS

S. Mahar et al "Real-Time Simultaneous Temperature and Strain Measurements At Cryogenic Temperatures in an Optical Fiber" Proc. of SPIE vol. 7087 70870I-1 (2008).

S.M. Maughan et al "Simultaneous distributed fibre temperature and strain sensor using microwave coherent detection of spontaneous Brullouin backscatter" Meas. Sci. Technol., vol. 12 (2001), pp. 834-842.

R. Faced et al "Analysis of optical Kerr effect induced coupling among polarization modes in high-birefringence optical fibers" Optics Communications, vol. 143 (1997), pp. 268-278.

G. Brambilla, "Optical fibre nanowires and microwires: a review" J. Opt., vol. 12 (Mar. 17, 2010), article 043001 (19pp).

Australian Patent Office; International Search Report and Written Opinion in corresponding PCT application (PCT/KR2010/008840); mailed Feb. 15, 2011.

(Continued)

*Primary Examiner* — Brian Healy
(74) *Attorney, Agent, or Firm* — Workman Nydegger (57) ABSTRACT

An optical fiber sensor may include an optical fiber configured to receive a light having a first frequency from a light source and to transmit the light through the optical fiber, the transmitted light having the first frequency and a second frequency which is generated by stimulated Brillouin scattering (SBS), a photodetector configured to receive the transmitted light from the optical fiber and to convert the transmitted light into an electric signal and a sensing circuit configured to calculate an average squared value of the electric signal received from the photodetector, which is dependent on a frequency difference between the first frequency and the second frequency.

18 Claims, 3 Drawing Sheets

OTHER PUBLICATIONS

J. W. Arkwright, et al "A fibre Bragg grating manometry catheter for in-vivo diagnostics of swallowing disorders" Optoelectronics and Communications Conference (OECC) 2008, Sydney Australia, Jul. 2008. TuI-2.

Eric Pinet, et al "Ultra-miniature all-glass Fabry-Perot pressure sensor manufactured a tthe tip of a multimode optical fiber" Fiber Optic Sensors and Applications V. Edited by Udd, Eric. Proceedings of the SPIE, vol. 6770, pp. 677000U (2007).

H. Y. Hsu, et al "Development of a MEMS based manometric catheter for diagnosis of functional swallowing disorders" Journal of Physics: Conference Series 34 (2006) pp. 955-960.

\* cited by examiner

OPTICAL FIBER SENSOR

BACKGROUND

Optical fibers can be used as sensors to measure a temperature, a strain or other quantities, such as a vibration, a pressure or acceleration, based on a change of value in the intensity, phase, polarization, wavelength or transit time of light propagating through the fiber during its propagation. By way of examples, an optical fiber sensor can be used in minute and sensitive environments, such as in a human body so as to sense a blood pressure, a pulse rate or a temperature. Further, an optical fiber sensor can also be used to monitor conditions of harsh environments, such as wings of airplanes, wind turbines, bridges, large dams, oil wells or pipelines.

SUMMARY

Various embodiments of optical fiber sensors, sensing circuits and methods are disclosed herein. In one illustrative embodiment, an optical fiber sensor includes an optical fiber configured to receive a light having a first frequency from a light source and to transmit the light through the optical fiber, the transmitted light having the first frequency and a second frequency which is generated by stimulated Brillouin scattering (SBS), a photodetector configured to receive the transmitted light from the optical fiber and to convert the transmitted light into an electric signal and a sensing circuit configured to calculate an average squared value of the electric signal received from the photodetector, which is dependent on a frequency difference between the first frequency and the second frequency.

In another embodiment, a method includes receiving a light passing through an optical fiber, the light having a first frequency and a second frequency, converting the light into an electric signal, calculating an average squared value of the electric signal, which is dependent on a frequency difference between the first frequency and the second frequency and sensing a quantity to be measured with reference to a lookup table showing a relationship between the average squared value of the electric signal and the quantity.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Figure 1:
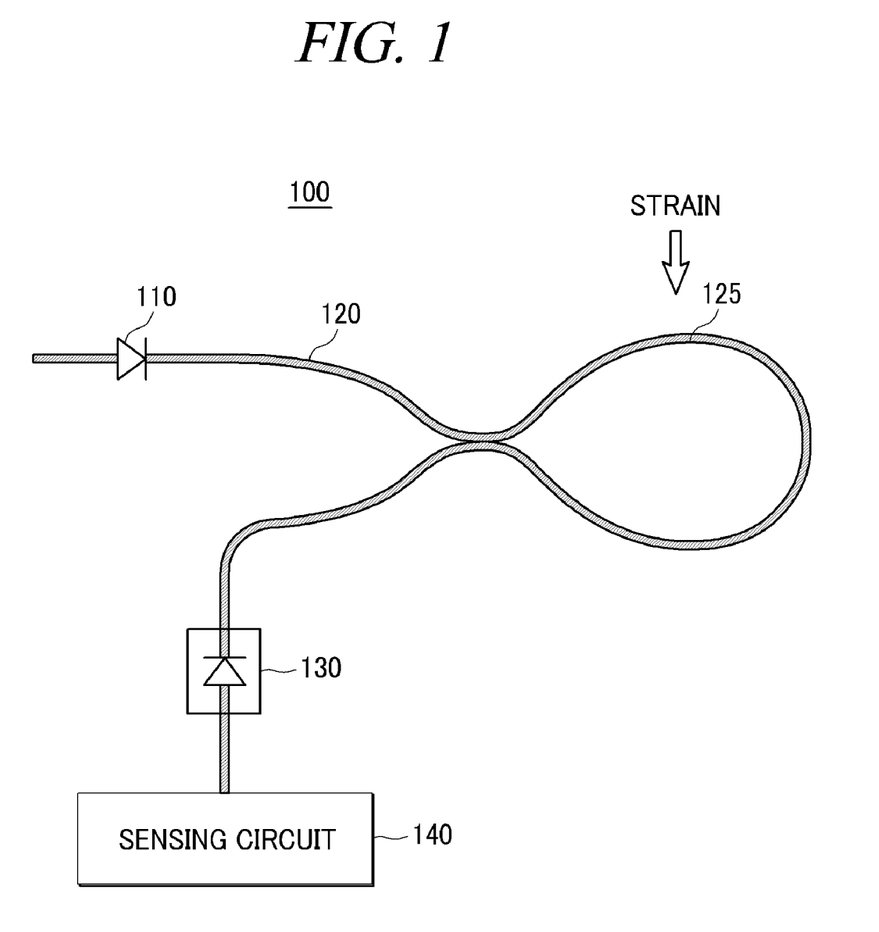
FIG. 1 is a schematic diagram showing an illustrative embodiment of an optical fiber sensor.

FIG. 1 is a schematic diagram showing an illustrative embodiment of an optical fiber sensor. An optical fiber sensor 100 may include a light source 110 (optional), an optical fiber 120, a photodetector 130 and a sensing circuit 140. Optical fiber 120 may include an optical fiber loop 125.

Light source 110 is optionally included in optical fiber sensor 100, and provides to optical fiber 120 a light having a first frequency, which will be described in detail hereinafter. In some embodiment, optical fiber sensor 100 may be construed without light source 110. In such a case, optical fiber sensor 100 may be provided with a light from an external light source. Light source 110 or the external light source may be a pump laser which generates a light.

Light source 110 or the external light source may include a semiconductor laser (laser diode) such as a Fabry-Perot laser, a Distributed Feed Back laser diode (DFB-LD), a Distributed Bragg Reflector laser diode (DBR-LD) or a Vertical Cavity Surface Emitting Laser (VCSEL) or an optical fiber laser which uses a multi-mode step index fiber, a multi-mode graded index fiber or a single-mode step index fiber, but not limited thereto.

Optical fiber 120 may be a glass or plastic fiber that carries a light along its length. Optical fiber 120 may include a material such as, but not limited to, silica, fluorozirconate, fluoroaluminate, chalcogenide glasses, tellurite glasses, bismuth glasses or any material capable of allowing a fairly good optical transmission over a wide range of wavelengths. By way of example, optical fiber 120 may have a diameter ranging from about 10 nm to about 1000 nm, such as about 10 nm, about 100 nm, about 200 nm, about 300 nm, about 400 nm, about 500 nm, about 600 nm, about 700 nm, about 800 nm, about 900 nm, or about 1,000 nm.

Optical fiber 120 can be widely used in fiber-optic communications, which permit transmission over longer distances and at higher bandwidths (data rates) than other forms of communications. Optical fiber 120 can be used instead of a metal wire because signals travel along optical fiber 120 with less loss, and optical fiber 120 is also immune to electromagnetic interference. Therefore, optical fiber 120 can be used for a variety of applications including sensors.

Optical fiber 120 may have optical fiber loop 125 on any location in optical fiber 120. In some embodiment, optical fiber loop 125 may be formed on a middle of optical fiber 120 as depicted in FIG. 1. Optical fiber loop 125 may have a wide range of a circumference length. By way of example, optical fiber loop 125 may have a circumference length ranging from about a few nanometers to about a few centimeters, such as about 100 nm, about 1 μm, about 100 μm, about 1 mm, about 100 mm or about 1 cm. Optical fiber loop 125 may be fabricated by using any of a variety of well-known methods, such as flame brushing. For example, by means of the flame brushing, optical fiber 120 may be uncoated using a chemical solution and a millimeter flame fed by oxygen and isobutane heats a small center fraction of optical fiber 120. Accordingly, optical fiber 120 having a length of a few centimeters or longer may be fabricated. Then, some parts of optical fiber 120 may be curved or coiled to form optical fiber loop 125, as depicted in FIG. 1, without limitation.

Optical fiber 120 is a cylindrical dielectric waveguide that transmits a light along its axis, by a process of total internal reflection. Optical fiber 120 has a core surrounded by a cladding layer, both of which are made of dielectric materials. The core of optical fiber 120 may have a higher refractive index than the cladding layer of optical fiber 120. Optical fiber 120 receives the light having the first frequency from light source 110. The light having the first frequency propagates through the core of optical fiber 120 in random directions. The propagation of the light through the core of optical fiber 120 is caused by the total internal reflection of the light. The total internal reflection is an optical phenomenon that occurs when a ray of a light strikes a medium boundary at an angle larger than a critical angle. The critical angle is an angle of incidence at which the light is refracted such that it travels along the boundary. When a light crosses a boundary between materials with different refractive indices, the light will be partially refracted at a surface of the boundary, and partially reflected. At this time, if the angle of incidence is greater than the critical angle, the light will stop crossing the boundary and instead be totally reflected back internally. This can only occur where the light travels from a medium with a higher refractive index to one with a lower refractive index. Accordingly, it is possible to confine the light in the core of optical fiber 120 so that the light may propagate through the core of optical fiber 120 and the light may not cross the boundary of the core and the cladding layer because the refractive index of the core is greater than that of the cladding layer.

The light received from light source 110 may surfer stimulated Brillouin scattering (SBS) phenomenon which is caused by a conflict between light photons and materials of which optical fiber 120 consists while passing through optical fiber 120. More specifically, the SBS refers to an interaction of light photons with acoustic or vibrational phonons, with magnetic spin waves, or with other low frequency quasi-particles. If a light having a narrow frequency bandwidth of about a few MHz and an optical power greater than a SBS threshold level which is modeled by Equation 1 is provided into an optical fiber, variations in an electric field of the light may produce acoustic vibrations in the optical fiber. Then, the light may undergo the stimulated Brillouin scattering by these vibrations, and, thus, a part of the light is frequency-shifted from a first frequency to a second frequency. Equation 1 is as follows.

$$SBS_{threshold\ level} = (21A_{eff})/(L_{eff}g_B)$$ [Equation 1]

where $A_{eff}$ is an available cross section of optical fiber 120, $L_{eff}$ is an available length of optical fiber 120 and $g_B$ is Brillouin gain coefficient which is varied depending on the material of optical fiber 120.

Figure 2:
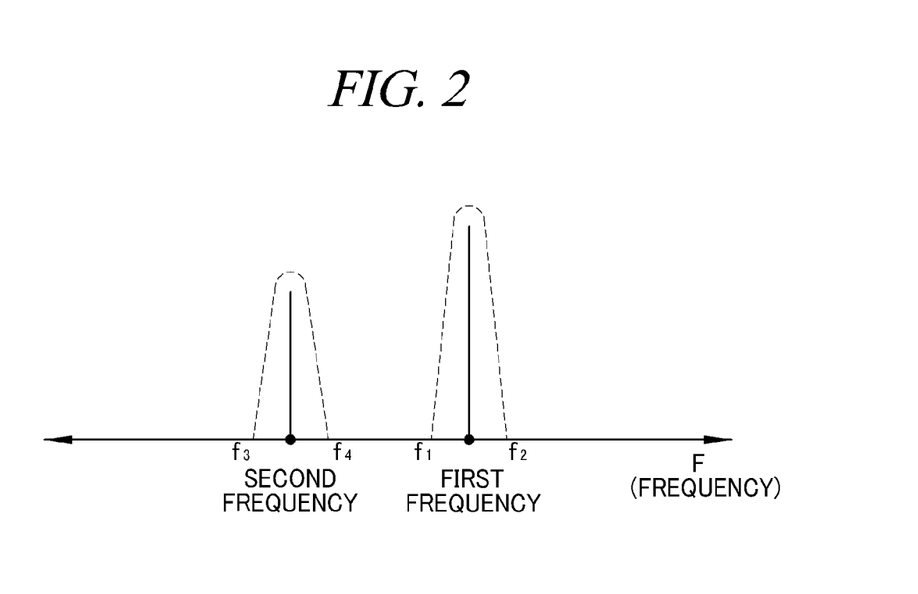
FIG. 2 shows a spectrum of a light received by a photodetector.

FIG. 2 shows a spectrum of a light transmitted through the optical fiber sensor of FIG. 1. A first frequency refers to the frequency of the light emitted from light source 110. In some embodiment, the light emitted from light source 110 may have a narrow frequency bandwidth which ranges from $f_1$ to $f_2$ and has a width of about a few MHz. The first frequency may be a center frequency between $f_1$ and $f_2$, or any frequency between $f_1$ and $f_2$. Further, the light emitted from light source 110 may have an optical power greater than a threshold level of SBS. Thus, the light which has suffered the SBS phenomenon may have a frequency bandwidth (from $f_3$ to $f_4$). For example, a second frequency of the light may be a center frequency or any frequency between $f_3$ and $f_4$. In some embodiment, a frequency difference between the first and second frequencies may be, but not limited to, about 1 GHz to about 10 GHz. Accordingly, a part of the light having the first frequency is frequency-shifted from the first frequency to the second frequency while suffering the SBS phenomenon.

Referring back to FIG. 1, optical fiber 120 transmits the light having the first frequency and the second frequency to photodetector 130 through optical fiber loop 125.

Optical fiber loop 125 may function or serve as a sensor head of optical fiber sensor 100. Optical fiber loop 125 may sense various kinds of quantities such as a temperature, a strain, a vibration, a pressure or acceleration. Hereinafter, for the simplicity of description, there will be explained a case in which an external strain is applied to optical fiber loop 125. By way of example, optical fiber loop 125 is exposed to an outside and the external strain is applied to exposed optical fiber loop 125. The applied strain may change a frequency of acoustic vibrations generated in optical fiber loop 125. Accordingly, the applied strain may affect an amount of a frequency shift which occurs in consequence of the SBS phenomenon because the amount of the frequency shift may be varied depending on a change of the frequency of the acoustic vibrations of optical fiber loop 125.

Photodetector 130 receives the light transmitted through optical fiber 120 and optical fiber loop 125. Since the light has suffered the SBS phenomenon by passing through optical fiber 120 and optical fiber loop 125, the light has the second frequency, in addition to the first frequency, as described above. Then, photodetector 130 converts the received light into an electric signal and transmits the electric signal to sensing circuit 140. Photodetector 130 may include various kinds of photo transistors or photodiodes. For example, the photo transistors may include a pnp-type photo transistor or an npn-type photo transistor and the photodiode may include a PN junction photodiode, a PIN junction photodiode, an Avalanche photodiode or a GaAsP photodiode. When a photon of sufficient energy strikes photodetector 130, it excites an electron, thereby creating a mobile electron and a positively charged electron hole. Then, holes move toward an anode, and electrons move toward a cathode, thereby producing a photocurrent.

Sensing circuit 140 receives the electric signal from photodetector 130. The electric signal transmitted from photodetector 130 can be modeled by Equation 2 as follows:

$$s(t) = \cos(\omega t) + \cos(\omega t + \Delta\omega t)$$ [Equation 2]

where s(t) is the electric signal inputted to sensing circuit 140 at time (t), $\omega$ is the first frequency, and $\Delta\omega$ is an amount of the difference between the first frequency and the second frequency which is frequency-shifted. The electric signal may indicate a current or a voltage but hereinafter, for the simplicity of description, there will be explained a case in which a current is inputted to sensing circuit 140.

Sensing circuit 140 may calculate an average squared value of the current received from photodetector 130. As shown in Equation 2, the current received from photodetector 130 can be described as a function of time. If the current is expressed by $I(t) = I_P \cos(\omega t)$, the average squared value of the current can be expressed by $$I_{ms} = \frac{1}{T}\int_0^T (Ip\cos(\omega t))^2 dt.$$

An example method for calculating the average squared value of the current will be described. First, sensing circuit 140 estimates a power of the current based on Equation 3 as follows:

$$P_s(t) = (\cos(\omega t) + \cos(\omega t + \Delta\omega t))^2 \quad \text{[Equation 3]}$$

$$= \frac{1 + \cos(2\omega t)}{2} + \frac{1 + \cos(2\omega t + 2\Delta\omega t)}{2} + 2(\cos(\omega t)\cos(\omega t + \Delta\omega t))$$

$$= \frac{1 + \cos(2\omega t)}{2} + \frac{1 + \cos(2\omega t + 2\Delta\omega t)}{2} + \cos(2\omega t + \Delta\omega t) + \cos(\Delta\omega t)$$

where $P_s(t)$ is the estimated power of the current at time (t), w is the first frequency and $\Delta\omega$ is the amount of the difference between the first frequency and the second frequency.

Second, sensing circuit 140 calculates the average squared value of the current by applying an integrator to the estimated power of the current over a period based on Equation 4 as follows:

$$x(t) = \frac{1}{T}\int\int_T \left( \frac{1 + \cos(2\omega t)}{2} + \frac{1 + \cos(2\omega t + 2\Delta\omega t)}{2} + \cos(2\omega t + \Delta\omega t) + \cos(\Delta\omega t) \right) dt \quad \text{[Equation 4]}$$

$$= \alpha + \frac{1}{T}\int_T \cos(\Delta\omega t)dt = \alpha + \beta$$

where x(t) is the average squared value of the current, ω is the first frequency and $\Delta\omega$ is the amount of the difference between the first frequency and the second frequency. As indicated in Equation 4, the average squared value of the current can be expressed by $\cos(\Delta\omega)$ and a value α which is independent of $\Delta\omega$.

The difference $\Delta\omega$ between the first frequency and the second frequency may be varied depending on the intensity value of the external strain. For example, if the intensity value of the external strain is strong, the shift from the first frequency to the second frequency may be great because the amount of the shift may be varied depending on the change of the frequency of the acoustic vibrations of optical fiber loop 125. For example, a stronger external strain may change the frequency of the acoustic vibrations more greatly. That is, when the stronger external strain is applied to optical fiber loop 125, the difference $\Delta\omega$ between the first frequency and the second frequency becomes larger. Further, as indicated in Equation 4, the average squared value of the current may be varied depending on the difference $\Delta\omega$ between the first frequency and the second frequency. Accordingly, if the relationship between the average squared value of the current and the intensity value of the external strain are already known, sensing circuit 140 can obtain the intensity value of the external strain based on the relationship.

By way of example, sensing circuit 140 can detect the intensity value of the external strain using a lookup table showing the relationship between the average squared value of the current and the external strain. The lookup table may be prepared in advance with experimental data. For example, the lookup table can be prepared by storing each intensity value of the external strain together with each average squared value of the current while varying the intensity value of the external strain. That is, the lookup table may be done by matching the average squared value of the current to the intensity value of the external strain.

Although FIG. 1 illustrates sensing circuit 140 that detects the strain, it will be apparent to those skilled in the art that sensing circuit 140 can also detect a temperature of an environment where optical fiber loop 125 is installed based on the average squared value of the current.

The difference between the first frequency and the second frequency is also varied depending on the temperature at which optical fiber loop 125 is installed. For example, if the temperature of the environment where optical fiber loop 125 is installed is high, the second frequency may be greatly shifted from the first frequency. That is, when optical fiber loop 125 is installed in a high temperature environment, the difference between the first frequency and the second frequency becomes larger. Further, the average squared value of the current may be varied depending on the difference $\Delta\omega$ between the first frequency and the second frequency. Accordingly, if a relationship between the average squared value of the current and the temperature is already known, a value of the temperature can be detected.

In another embodiment, sensing circuit 140 can detect the temperature using a similar method which is used to detect the intensity value of the external strain as described above. For example, sensing circuit 140 can detect the temperature using a lookup table showing a relationship between the average squared value of the current and the temperature.

Figure 3:
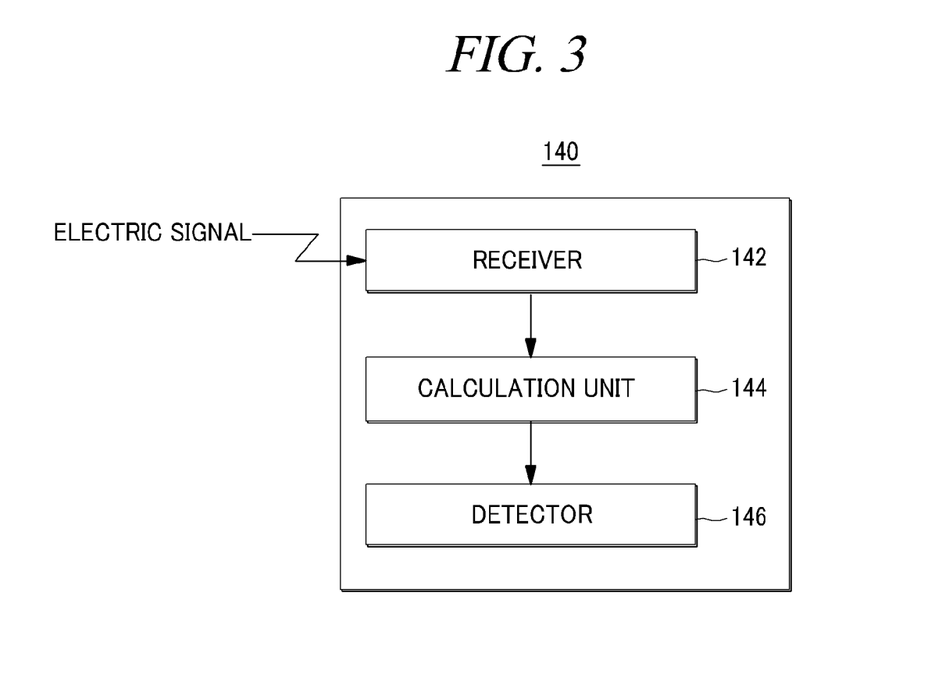
FIG. 3 is a block diagram showing an illustrative embodiment of a sensing circuit of the optical fiber sensor of FIG. 1.

FIG. 3 is a block diagram showing an illustrative embodiment of the sensing circuit depicted in FIG. 1. As depicted in FIG. 3, sensing circuit 140 of optical fiber sensor 100 may include a receiver 142, a calculation unit 144 and a detector 146. Receiver 142 receives the electric signal from photodetector 130 such as, but not limited to, a photodiode or a photo transistor. The electric signal may have both a first frequency and a second frequency, as described above The electric signal inputted to receiver 142 can be modeled as Equation 2 above. Further, the electric signal may indicate a current or a voltage but hereinafter, for the simplicity of description, there will be explained a case in which a current is inputted to receiver 142.

Calculation unit 144 calculates an average squared value of the current. To calculate the average squared value of the current, calculation unit 144 estimates a power of the current according to Equation 3 above. Then, calculation unit 144 calculates the average squared value of the current by applying an integrator to the estimated power of the current over a period according to Equation 4 and then the average squared value of the current can be obtained.

Detector 146 receives the obtained value of the average squared value of the current. Then, detector 146 detects various quantities to be measured based on the average squared value of the current with reference to a lookup table showing a relationship between the average squared value of the current and the quantities.

By way of example, detector 146 may be a strain detector to detect an intensity value of a strain applied to optical fiber loop 125. Since an amount of a frequency shift is varied depending on the intensity value of the strain and the average squared value of the current is varied depending on the amount of the frequency shift, if a relationship between the average squared value of the current and the strain is already known, the intensity value of the strain can be obtained. The strain detector can detect the intensity value of the applied strain using a lookup table which is done by matching the average squared value of the current to the intensity value of the strain and shows the relationship between the average squared value of the current and the intensity value of the strain.

Further, detector 146 may be a temperature detector to detect a temperature of an environment where optical fiber sensor 100 is installed. Since the amount of the frequency shift is varied depending on the temperature and the average squared value of the current is varied depending on the amount of the frequency shift, if a relationship between the average squared value of the current and the temperature is already known, the temperature can be obtained. The temperature detector can detect the temperature in various ways. For example, the temperature detector can detect the temperature using a lookup table which shows the relationship between the average squared value of the current and the temperature.

Although detector 146 is illustrated to include the strain detector and the temperature detector, it will be apparent to those skilled in the art that detector 146 may include other types of detectors which have the same configuration as the strain detector or the temperature detector and are capable of sensing other quantities, such as a vibration, a pressure or acceleration. For example, optical fiber sensor 100 including a vibration detector can be placed on wings of airplanes, bridges or large dams to detect vibration occurred on a surface of them. Further, optical fiber sensor 100 including a blood pressure detector can be inserted into human body to sense a blood pressure or disposed on a neck or a wrist of human body to sense a pulse rate. Furthermore, optical fiber sensor 100 including an acceleration detector can be adhered to a surface of wind turbines or motors to detect acceleration generated from them.

Figure 4:
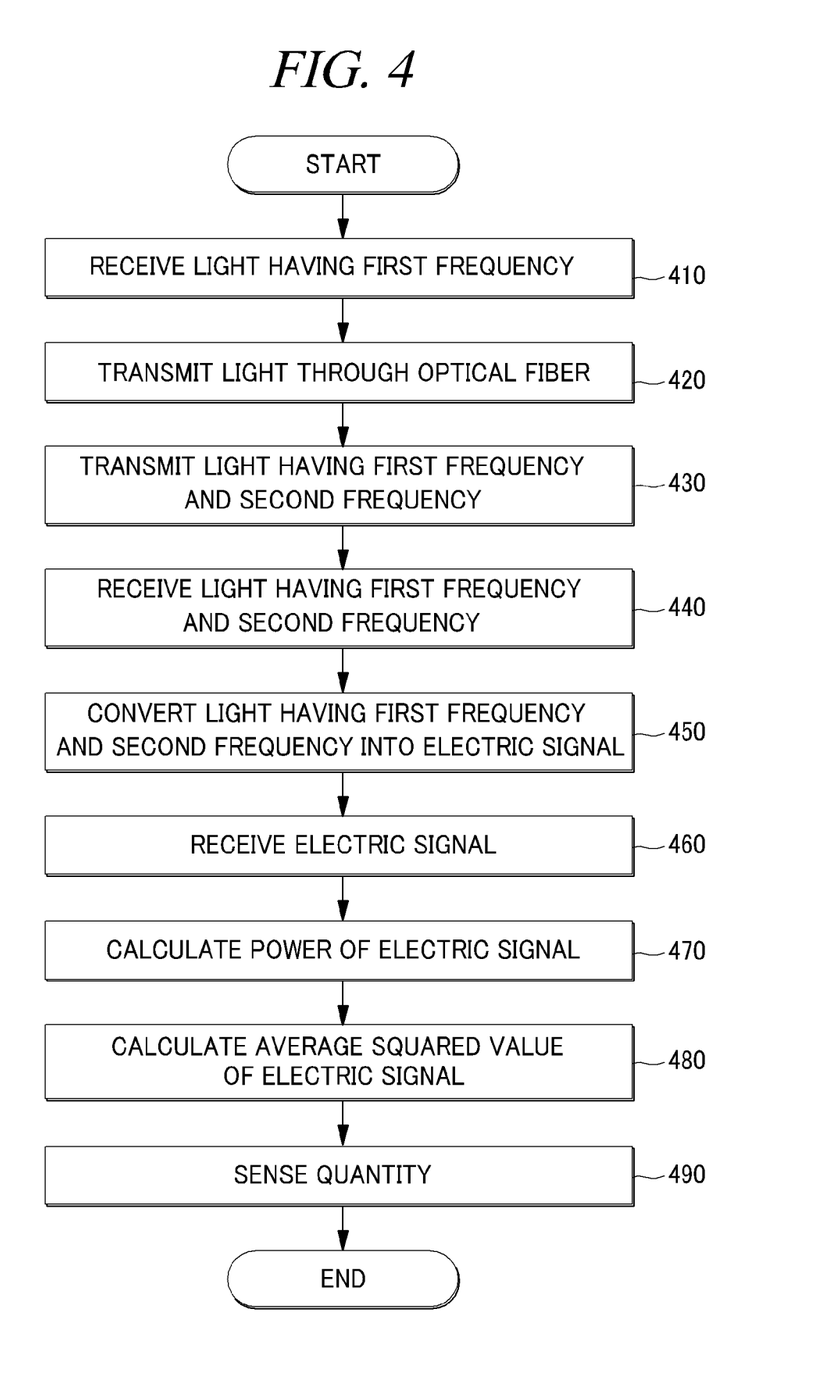
FIG. 4 is a flow diagram of an illustrative embodiment of a sensing method.

FIG. 4 is a flow diagram of an illustrative embodiment of a sensing method. A light having a first frequency is introduced into an optical fiber (e.g., optical fiber 120) from a light source (e.g., light source 110), such as a laser diode to the optical fiber and the optical fiber receives the light having the first frequency (block 410). The light source emits a light having a narrow frequency bandwidth of about a few MHz and an optical power greater than a SBS threshold level as modeled by Equation 1 into a core of the optical fiber. The first frequency may be a center frequency of the narrow frequency bandwidth or any frequency in the narrow frequency bandwidth.

Then, the light is transmitted through the optical fiber (block 420). While being transmitted through the optical fiber, the light becomes to have the first frequency and a second frequency which is frequency-shifted from the first frequency because of stimulated Brillouin scattering (SBS) phenomenon. Since the light transmitted through the optical fiber has the optical power greater than the SBS threshold level and variations in an electric field of the light may produce acoustic vibrations in the optical fiber, the light may undergo the stimulated Brillouin scattering by these vibrations, and, thus, a part of the light is frequency-shifted from the first frequency to the second frequency.

The light having the first frequency and the second frequency is transmitted through the optical fiber (block 430) and then the light having the first and second frequencies is received by a photodetector (e.g., photodetector 130) (block 440). Thereafter, the light having the first frequency and the second frequency is converted into an electric signal by the photodetector, such as a photodiode (block 450), and the photodetector transmits the electric signal to a sensing circuit (e.g., sensing circuit 140). The electric signal can be modeled as Equation 2.

The electric signal which is converted from the light having the first frequency and the second frequency is received by the sensing circuit (block 460). A power of the electric signal is calculated so as to obtain an average squared value of the electric signal transmitted from the photodetector by the sensing circuit based on Equation 3 (block 470). The sensing circuit calculates the average squared value of the electric signal by applying an integrator to the power of the electric signal over a period based on Equation 4 (block 480).

Various quantities to be measured can be sensed based on the average squared value of the electric signal with reference to a lookup table showing a relationship between the average squared value of the electric signal and the quantities (block 490). For example, a strain applied to the optical fiber can be sensed based on the average squared value of the electric signal. The sensing circuit can detect an intensity value of the strain using a lookup table which expresses a relationship between the average squared value of the electric signal and the strain. Further, a temperature of an environment where the optical fiber is installed is also sensed based on the average squared value of the electric signal. The sensing circuit can detect the temperature using a lookup table which expresses a relationship between the average squared value of the electric signal and the temperature.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or, "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a second third, middle third and first third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An optical fiber sensor comprising:
   a single light source;
   an optical fiber coupled to the single light source and configured to receive a light having a first frequency from the single light source and to transmit the light having the first frequency through the optical fiber, the transmitted light having the first frequency configured to undergo stimulated Brillouin scattering (SBS) while being transmitted through the optical fiber such that a second frequency of the transmitted light is generated, the second frequency being shifted from the first frequency, the transmitted light including the first and second frequencies;
   a photodetector configured to receive the transmitted light from the optical fiber and to convert the transmitted light into an electric signal; and
   a sensing circuit configured to calculate an average squared value of the electric signal received from the photodetector, which is dependent on a frequency difference between the first frequency and the second frequency.

2. The optical fiber sensor of claim 1, wherein the sensing circuit comprises:
   a strain detector configured to detect a strain applied to the optical fiber with reference to a lookup table showing a relationship between the average squared value of the electric signal and the applied strain.

3. The optical fiber sensor of claim 1, wherein the sensing circuit comprises:
   a temperature detector configured to detect a temperature of an environment where the optical fiber is installed with reference to a lookup table showing a relationship between the average squared value of the electric signal and the temperature.

4. The optical fiber sensor of claim 1, wherein the light source is a pump laser that generates the light having an optical power greater than a SBS threshold level.

5. The optical fiber sensor of claim 1, wherein the optical fiber has a diameter ranging from about 10 nm to about 1000 nm.

6. The optical fiber sensor of claim 1, wherein the optical fiber forms an optical loop.

7. The optical fiber sensor of claim 1, wherein the photodetector is a photodiode.

8. The optical fiber sensor of claim 1, wherein the sensing circuit comprises:
   a receiver configured to receive the electric signal from the photodetector;
   a calculation unit configured to calculate the average squared value of the electric signal; and
   a detector configured to detect a quantity to be measured with reference to a lookup table showing a relationship between the average squared value of the electric signal and the quantity.

9. The optical fiber sensor of claim 8, wherein the detector comprises:
   a strain detector configured to detect a strain applied to the optical fiber with reference to the lookup table showing a relationship between the average squared value of the electric signal and the applied strain.

10. The optical fiber sensor of claim 8, wherein the detector comprises:
    a temperature detector configured to detect a temperature of an environment where the optical fiber is installed with reference to the lookup table showing a relationship between the average squared value of the electric signal and the temperature.

11. The optical fiber sensor of claim 1, wherein the first frequency is shifted to generate the second frequency such that a frequency difference between the first and second frequencies ranges from about 1 GHz and about 10 GHz.

12. The optical fiber sensor of claim 1, wherein the electric signal is current.

13. A method comprising:
    receiving a light from a single light source and passing the received light through an optical fiber, the light having a first frequency and a second frequency;
    converting the light into an electric signal;
    calculating an average squared value of the electric signal, which is dependent on a frequency difference between the first frequency and the second frequency; and
    sensing a quantity to be measured with reference to a lookup table showing a relationship between the average squared value of the electric signal and the quantity.

14. The method of claim 13, wherein the first frequency is shifted to generate the second frequency in response to stimulated Brillouin scattering (SBS) occurred in the optical fiber while the light having the first frequency passes through the optical fiber.

15. The method of claim 13, wherein sensing the quantity comprises:
    sensing a strain applied to the optical fiber with reference to the lookup table showing a relationship between the average squared value of the electric signal and the applied strain.

16. The sensing method of claim 13, wherein sensing the quantity comprises:

sensing a temperature of an environment where the optical fiber is installed with reference to the lookup table showing a relationship between the average squared value of the electric signal and the temperature.

17. The method of claim 13, wherein the frequency difference between the first frequency and the second frequency ranges from about 1 GHz to about 10 GHz.

18. The method of claim 13, wherein the electric signal is current.

* * * * *

UNITED STATES PATENT AND TRADEMARK OFFICE
CERTIFICATE OF CORRECTION

PATENT NO. : 8,270,782 B2  
APPLICATION NO. : 12/695288  
DATED : September 18, 2012  
INVENTOR(S) : Lee

It is certified that error appears in the above-identified patent and that said Letters Patent is hereby corrected as shown below:

Title Page 2, Item (56), under "OTHER PUBLICATIONS", in Column 1, Line 6, delete "a tthe" and insert -- at the --, therefor.

In Column 5, Line 12, delete "w" and insert -- ω --, therefor.

In Column 11, Line 6, delete ""A" or," and insert -- "A" or --, therefor.

Signed and Sealed this
Twenty-fifth Day of December, 2012

David J. Kappos
*Director of the United States Patent and Trademark Office*